(12) United States Patent
Stephany et al.

(10) Patent No.: US 6,184,534 B1
(45) Date of Patent: Feb. 6, 2001

(54) METHOD OF PULSING LIGHT EMITTING DIODES FOR READING FLUORESCENT INDICIA, DATA READER, AND SYSTEM

(75) Inventors: Thomas M. Stephany, Churchville; Bryan D. Bernardi, Rochester; Robert C. Bryant, Honeoye Falls; David J. Nelson, Rochester, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/128,881

(22) Filed: Aug. 4, 1998

(51) Int. Cl.[7] ....................................................... G01J 1/58
(52) U.S. Cl. ..................................... 250/459.1; 250/458.1
(58) Field of Search ................................ 250/458.1, 459.1

(56) References Cited

U.S. PATENT DOCUMENTS

| | | |
|---|---|---|
| 3,416,426 | 12/1968 | Land . |
| 4,598,198 | 7/1986 | Fayfield . |
| 4,603,262 | 7/1986 | Eastman et al. . |
| 4,652,750 | 3/1987 | Eastman et al. . |
| 4,820,911 | 4/1989 | Arackellian et al. . |
| 4,914,460 | 4/1990 | Caimi et al. . |
| 4,983,817 | 1/1991 | Dolash et al. . |
| 4,983,996 | 1/1991 | Kinoshita . |
| 5,059,126 | 10/1991 | Kimball . |
| 5,135,160 | 8/1992 | Tasaki . |
| 5,142,299 | 8/1992 | Braun . |
| 5,212,371 | 5/1993 | Boles et al. . |
| 5,289,220 | 2/1994 | Fidler et al. . |
| 5,314,336 | 5/1994 | Diamond et al. . |
| 5,323,010 | * 6/1994 | Gratton et al. ..................... 250/458.1 |
| 5,325,383 | 6/1994 | Davis et al. . |
| 5,378,883 | 1/1995 | Batterman et al. . |
| 5,448,323 | 9/1995 | Clark et al. . |
| 5,468,949 | 11/1995 | Swartz et al. . |
| 5,486,944 | 1/1996 | Bard et al. . |
| 5,502,304 | 3/1996 | Berson et al. . |
| 5,547,501 | 8/1996 | Maruyama et al. . |
| 5,550,364 | 8/1996 | Rudeen . |
| 5,576,550 | * 11/1996 | Koppikar ......................... 250/459.1 |
| 5,578,818 | * 11/1996 | Kain et al. ........................ 250/234 |
| 5,598,007 | 1/1997 | Bunce et al. . |
| 5,627,360 | 5/1997 | Rudeen . |
| 5,644,557 | 7/1997 | Akamine et al. . |
| 5,666,557 | 9/1997 | McIntyre et al. . |
| 5,668,364 | 9/1997 | Swartz et al. . |
| 5,686,300 | * 11/1997 | Berndt ............................. 435/287.5 |
| 5,693,693 | 12/1997 | Auslander et al. . |
| 5,710,834 | 1/1998 | Rhoads . |
| 5,717,968 | * 2/1998 | Stephenson, III et al. ........ 396/315 |
| 5,780,207 | 7/1998 | Mohapatra et al. . |
| 5,994,707 | * 11/1999 | Mendoza et al. ................. 250/458.1 |

* cited by examiner

*Primary Examiner*—Constantine Hannaher
*Assistant Examiner*—Otilia Gabor
(74) *Attorney, Agent, or Firm*—Robert Luke Walker

(57) ABSTRACT

A system includes a data reader and media bearing fluorescent indicia. A method includes the steps of: pulsing a light emitting diode at a forward current level above continuous use operating limits to produce pulsed radiation within an absorption spectrum of the fluorescent material and at a flux density sufficient to induce a fluorescent emission from the indicia; illuminating the indicia with the pulsed radiation to produce the fluorescent emission; and imaging the indicia on a radiation image sensor sensitive to radiation within an emission spectrum of the fluorescence.

12 Claims, 5 Drawing Sheets

METHOD OF PULSING LIGHT EMITTING DIODES FOR READING FLUORESCENT INDICIA, DATA READER, AND SYSTEM

CROSS REFERENCE TO RELATED APPLICATIONS

Reference is made to commonly assigned co-pending U.S. patent applications Ser. No. 08/931,575 and filed in the names of Peter Soscia, Jeffrey Small Thomas Reiter.

FIELD OF THE INVENTION

This invention relates generally to illumination for data reading, and more particularly relates to pulsing a light emitting diode for illuminating an invisible ink or dye deposited upon a media of some type, such a, a photographic print.

BACKGROUND OF THE INVENTION

Machine readable optical data codes are widely used. Optical data codes are in the form of one-dimensional codes, commonly referred to as "bar codes", and two-dimensional codes, sometimes referred to as "two-dimensional bar codes". Simple, manually scanned readers, such as that disclosed in U.S. Pat. No. 4,603,262, can be provided for one-dimensional codes. More complex readers are needed for two-dimensional codes. These readers are held over the code, while the reader internally scans the code or captures an instantaneous two-dimensional image.

A code can be read as a visible light image or as invisible radiation image. Some optical code readers illuminate visible bar codes with a beam of invisible or "nearly invisible" radiation and detect a resulting fluorescence or reflectance of an indicia. U.S. Pat. No. 4,603,262 and U.S. Pat. No. 4,652,750 teach reading a code by scanning with an invisible beam. U.S. patent application Ser. No. 08/931,575, filed Sep. 16, 1997, discloses the use of a printed invisible encodement on a photographic image to record sound information. The encodement is read by illuminating using a beam of invisible electromagnetic radiation that is subject to modulation by the encodement. The resulting encodement image is captured, decoded, and played back by a data reader.

Commercially available inks are available to be used door the purpose of encoding information upon the surface of a media such as a photographic print. An example of such a commercially available ink is Tennessee Eastman Company part number pm19599/10. This ink exhibits a fairy linear light input versus light output transfer function, so it is understood that illuminating the ink with twice as much light energy results in twice the amount of fluorescent light output from the ink.

Readers commonly include an illumination source. Using an array of light emitting diodes (LED's) to illuminate an area is well known. U.S. Pat. No. 5,319,182 by Havens et. al., discusses the use of an integrated source-image sensor matrix in which an array of photonic devices can be configured to both emit light and detect light, for the purpose of reading indicia. Depending upon the wavelengths of illumination necessary, LED arrays can be very costly. Large amounts of light are generally needed to obtain a satisfactory signal to noise ratio. For example, with a luminescent dye or ink, the illuminated surface must emit enough fluorescent light to sufficiently stimulate the image sensor used to read the fluorescent output emission. It is conceivable that many different inks or dyes can be used to encode data on a medium. A variety of factors such as temperature, humidity, ambient light and time which can cause the output fluorescence of the inks or dyes to change, making encoded data less detectable. To the signal to noise requirement for the dye or ink, must also be added an additional factor for system losses from filters and the like.

Another consideration is minimizing the number of LED's to reduce cost, limit size and maximize efficiency. The ability of an LED to dissipate the electrical power consumed by the production of photons is limited. While packaging and heat management practices such as heat sinking can help, the power consumed, which manifests itself by a buildup of heat in the semiconductor junction, is the culprit which ultimately destroys the LED. A need for high amounts of light energy requires additional LED's for the production of those photons. The additional LED's allow for more illumination capacity, but also increase the power requirements of the system by producing more waste heat. The additional LED's also increase manufacturing cost.

Since it is highly desirable to read encoded media with portable equipment, it is apparent that simply adding more LED's to an array, in an effort to increase illumination, will substantially increase size and cost. Additionally, multiple LED's consume large amounts of power and are best avoided in portable applications.

U.S. Pat. No. 5,717,968 discloses a camera in which an LED, used to write an optical code on film, is powered at a current level beyond its continuous operating limits.

It is, therefore, desirable to provide an improved method of illumination of a fluorescent indicia which enhances illumination capacity while limiting the size of a data reader.

SUMMARY OF THE INVENTION

The invention is defined by the claims. The invention, in its broader aspects, provides a system that includes a data reader and media bearing fluorescent indicia and a method comprising the steps of: pulsing, a light emitting diode at a forward current level above continuous use operating limits to produce pulsed radiation within an absorption spectrum of the fluorescent material and at a flux density sufficient to induce a fluorescent emission from the indicia; illuminating the indicia with the pulsed radiation to produce the fluorescent emission; and imaging the indicia on a radiation image sensor sensitive to radiation within an emission spectrum of the fluorescence.

It is an advantageous effect of at least some of the embodiments of the invention that an improved method of illumination of a fluorescent indicia which enhances illumination capacity while limiting the size of a data reader.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the invention, one or more light emitting diodes are driven past a constant current operating level, for a period of time limited by the excess heat generated by the driving process, to increase light output. This light is used to illuminate a surface which is coated with an ink or dye which fluoresces at a wavelength which is different from the wavelength of illumination. It is preferred that the illuminating radiation and fluorescence are both invisible to the human eye, but the illuminating radiation or fluorescence, or both can be in a spectrum of light which is visible to the human eye.

Figure 1:
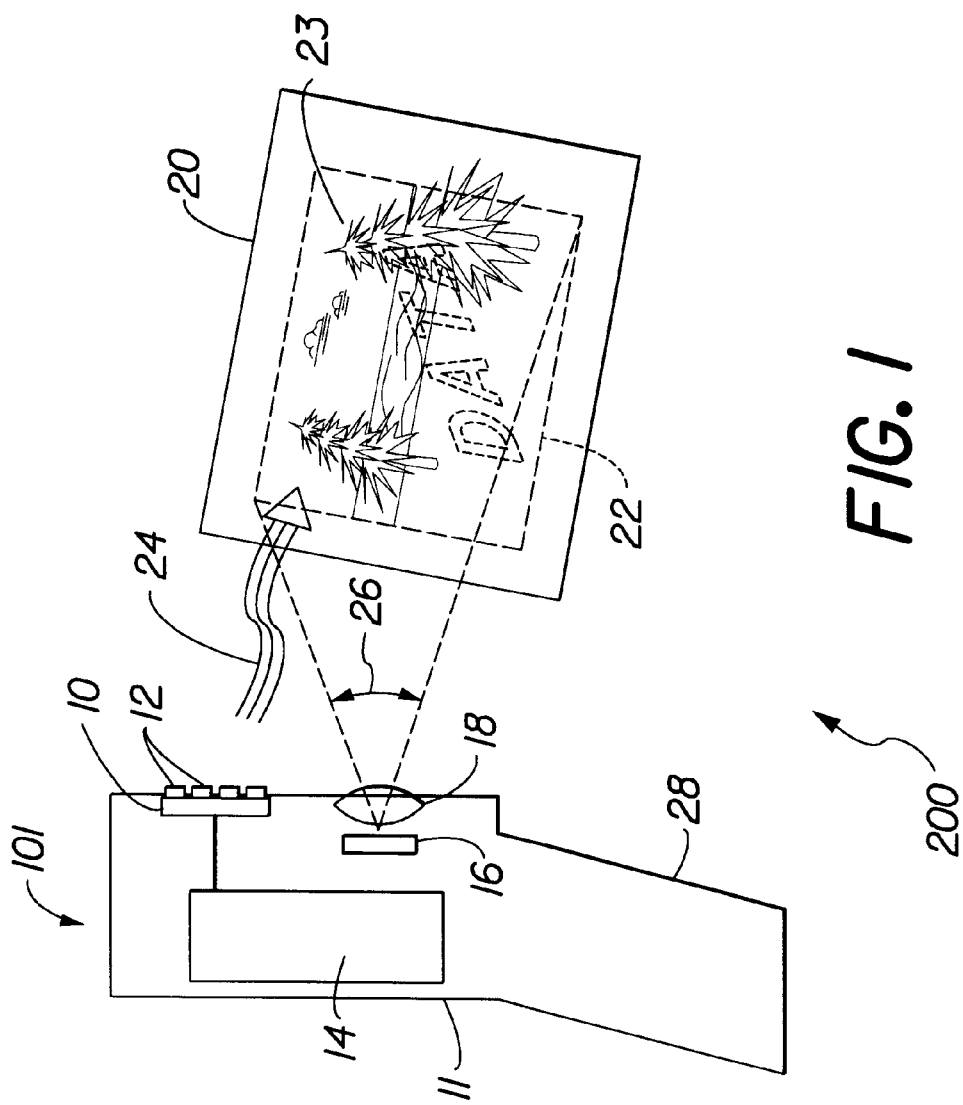
FIG. 1 is a semi-diagrammatical view of an embodiment of the system of the invention including the data reader.

Referring to FIG. 1, the data reader 101 has a body 11 that holds an array 10 of one or more light emitting diodes 12 and a power unit 14 that drives the light emitting diodes 12. The body 11 also supports an image sensor 16, located adjacent the light emitting diodes 12 and an optical system 18 that images on the image sensor 16. The system 200 of the invention also includes media 20 bearing an indicia 22 (indicated by dashed lines forming a rectangle and the word "DATA") printed with fluorescent material such as ink or dye. The media 20 can also bear a visible image 23 (shown in FIG. 1 as a pair of trees). In use, the light emitting diode or diodes 12 emit photons (illustrated as arrow 24) onto the indicia 22 and a luminescent emission (illustrated as dashed lines 26) from the indicia 22 is directed by the optical system 18 onto the image sensor 16 and is; detected. The data reader 101 is preferably portable and has a handle 28 which can be gripped by the user during use.

Figure 2:
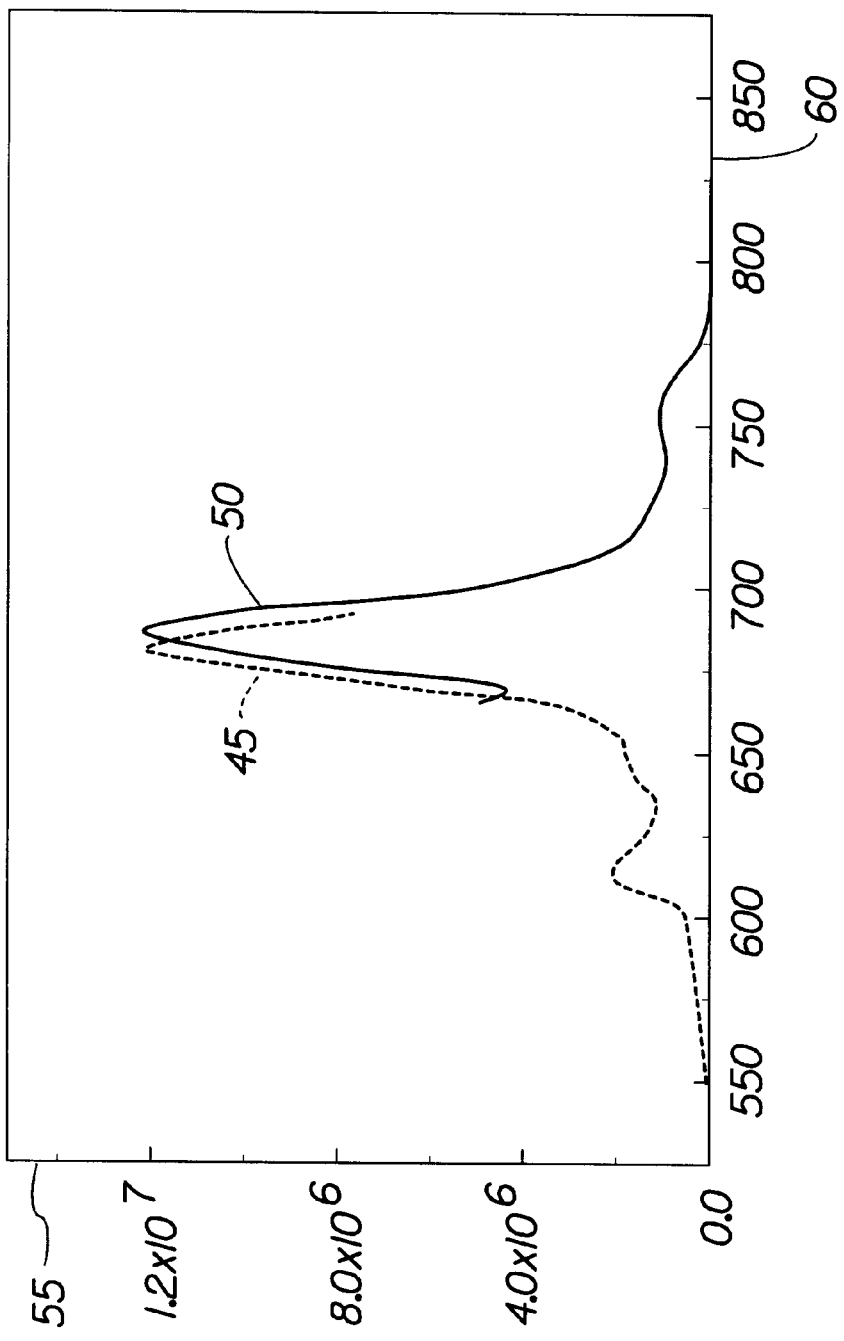
FIG. 2 is a graph showing the input illumination (arbitrary units) and fluorescent output (nm) characteristics of Tennessee Eastman ink pm19599/10.
Figure 3:
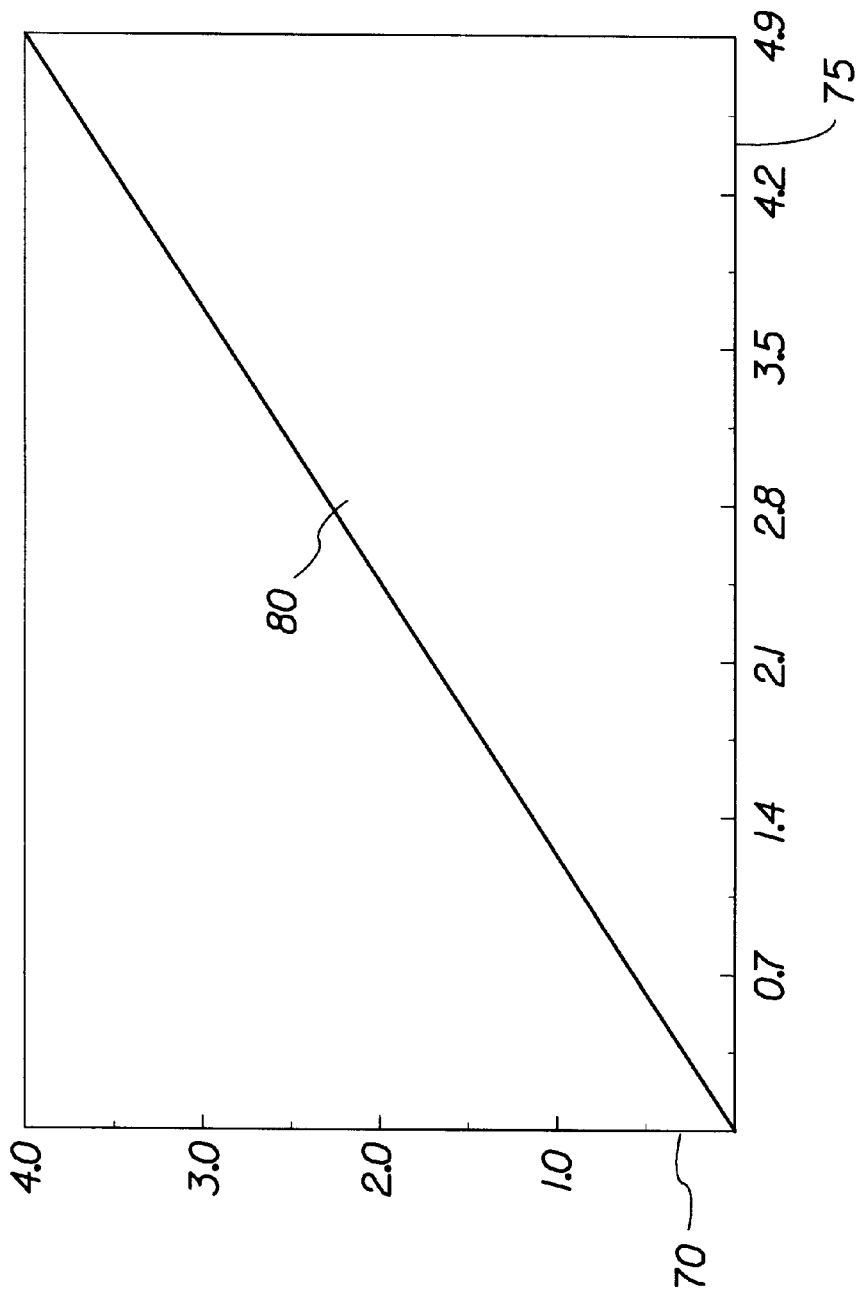
FIG. 3 is a graph showing typical quantum efficiency of Tennessee Eastman ink pm19599/10.

The image sensor 16 is sensitive to a band of radiation within a fluorescence emission spectrum of the fluorescent material of the indicia 22 and can, thus, detect a radiation image of the indicia 22. In a particular embodiment, the fluorescent emission is invisible, and is preferably infrared radiation. An example of a suitable material for the indicia is Tennessee Eastman ink pm19599/10. FIG. 2 shows a graph of the fluorescent response of the TEC pm19599/10 ink. A dashed line 45, is representative of a range of spectral illuminations absorbed by the ink. A solid line 50 represents the fluorescent emission of the ink. The vertical axis 55 represents intensity and the horizontal axis 60 represents wavelength. Referring next to FIG. 3, a graph shows a typical quantum efficiency for an ink of this type. The horizontal axis 75 represents photons received by the ink and the vertical axis 70 represents fluorescent photons output by the ink. The number of fluorescent photons from this type of an ink is directly and linearly proportional to the number of photons absorbed from the illuminating LED array 10, as shown by data line 80.

The image sensor 16 comprises one or more radiation-sensitive electrical devices which convert an impinging radiation beam into a digital image, that is, an electrical signal from which a one or two dimensional image can be reconstructed. The light-sensitive electrical device can be a charge coupled device, a charge injection device, a photodiode, a CMOS imager, or another type of photoelectric transducer. The digital image sensor can include one or more two-dimensional light-sensitive electrical devices, or one or more two dimensional arrays of such devices, or one or more one-dimensional arrays of such devices. With one-dimensional arrays, the image sensor includes means, well known to those of skill in the art, for scanning the incident beam to provide a two-dimensional digital image. Two-dimensional devices are preferred over one dimensional devices and the use of single discrete devices is currently preferred over the use of arrays of smaller devices for reasons of image quality and ease of assembly. The use of the single two-dimensional capture device is preferred for reasons of economy. An example of a suitable digital image sensor comprises a single CCD, such as a charge coupled device marketed by Eastman Kodak Company of Rochester, N.Y. as Model No. KAF-6300. Lower resolution digital image detectors can also be used, depending upon the resolution required, such as a VGA (video graphics array) sensor having a resolution of 640 by 480 pixels.

Figure 4:
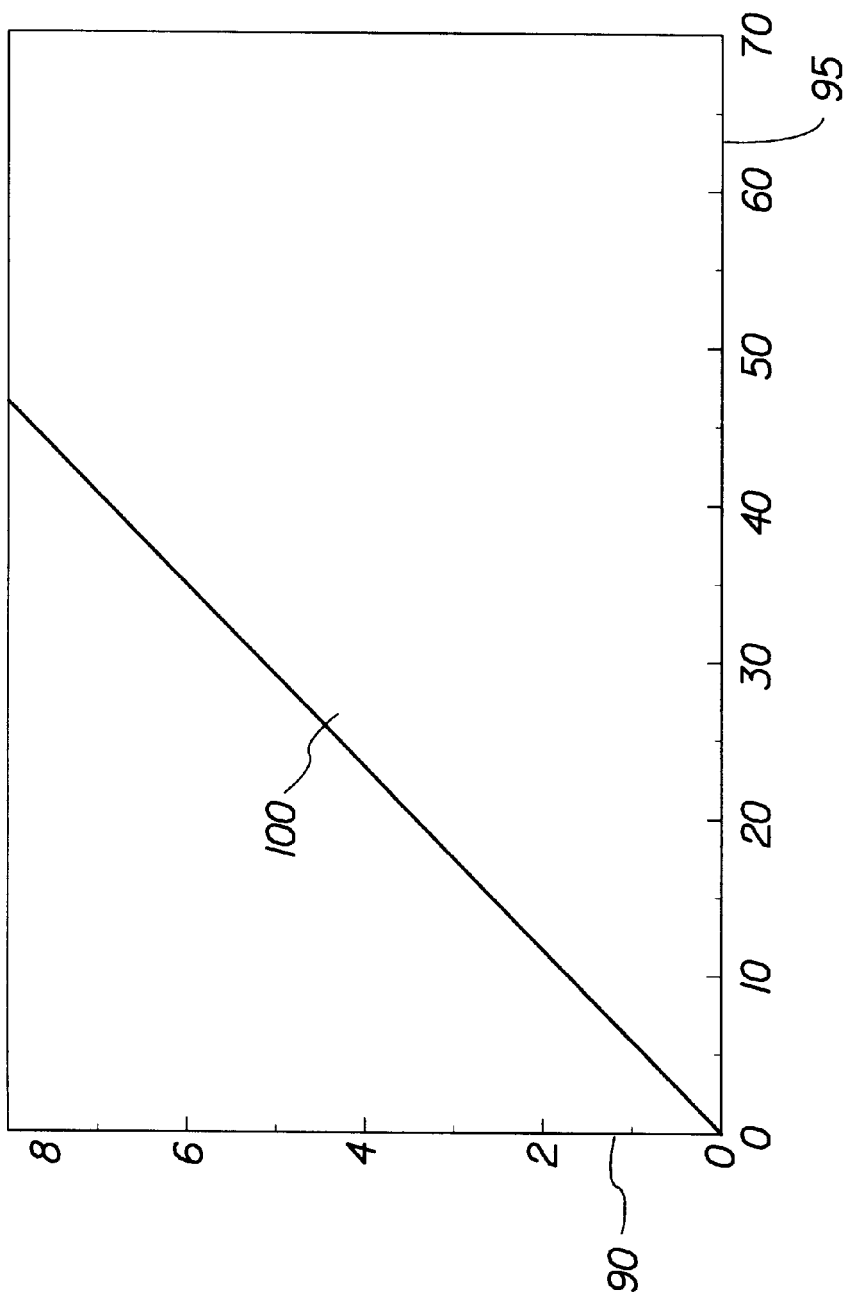
FIG. 4 is a graph of relative light output vs. forward current of a Rohm SIR-320ST3F light emitting diode.

A variety of different light emitting diodes can be used, however, it is preferred that the light emitting diodes efficiently emit light in a band within the absorption spectrum of the luminescent material. FIG. 4 is a graph of the relative light output vs. forward current of a typical light emitting diode 12, a Rohm SIR-320ST3F infra-red LED, manufactured by Rohm Company Limited, Tokyo, Japan. The vertical axis 90, shows photo output power in milliwatts, and the horizontal axis 95 shows LED forward current in milliamperes. The data line 100 indicates a linear relationship between these two parameters and shows that any additional current sent through the LED will produce proportionately more light from the LED, through the range of values shown.

The power unit 14 drives the light emitting diodes 12 with a pulsed forward current at a level above continuous use operating limits for each of the light emitting diodes 12. Referring to FIG. 4, pulsing the LED, for 100 microseconds with a 1% duty cycle allows overdriving the LED forward current up to 1000 milliamperes, thus yielding approximately 180 peak milliwatts of photo output power. This number is determined by calculating the slope of the data line 100 which is 0.18 milliwatts per milliampere, and multiplying by 1000 milliamperes. Driving the same LED in its normal mode of operation at 75 milliamperes of constant current will yield 13.5 milliwatts of constant photo output power. Thus 180 milliwatts of peak output power would require approximately 13 individual LED's driven in the normal mode of operation. The flux density of the emission from the LED array must be sufficient to cause the indicia to fluoresce. The number of light emitting diodes of a particular type needed in an array for a particular forward current, capture rate, and favorable signal to noise ratio is readily determined in a manner well known to those of skill in the art. Quick capture of the fluorescence in the material of the indicia 22 is desirable for user convenience. A suitable forward current can be readily determined for different LED's by simple trial and error.

Figure 5:
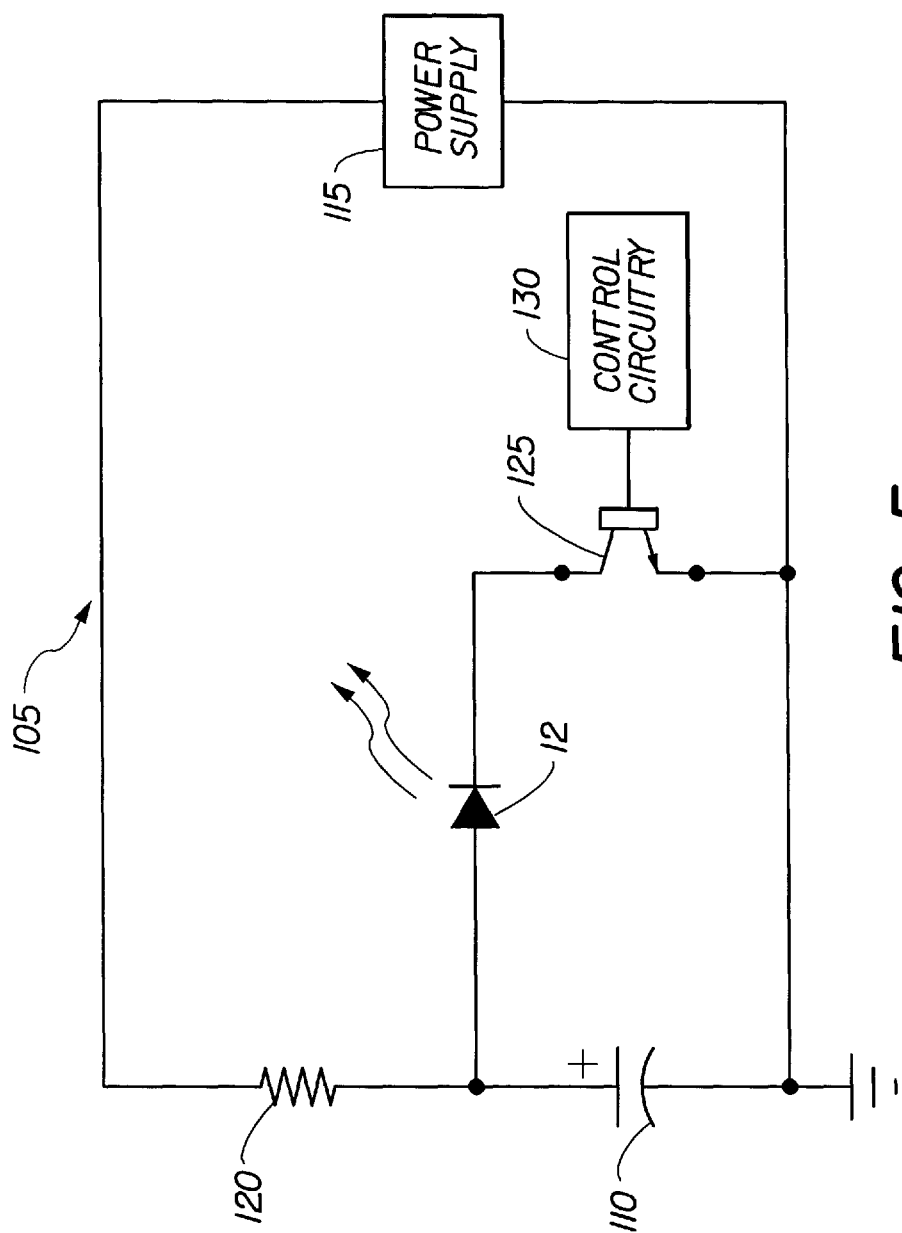
FIG. 5 is a schematic diagram of a pulsing circuit of another embodiment of the data reader having a single light emitting diode.

FIG. 5 is a schematic diagram of a simple drive circuit 105 for the pulsing of an LED 12. A capacitor 110 is shown connected to a power supply 115 which provides current for the charging of capacitor 110 through resistor 120. The time constant of this RC network sets a specific charge time for capacitor 110. This is necessary for the purpose of limiting charge current from power supply 115 upon capacitor 110 being discharged through LED 12, since a surge of recharge current will interfere with the proper regulation of power supply 115. Resistor 120 also serves the purpose of isolating LED 12 from power supply 115. LED 12 is connected to transistor 125 which operates as a switch to control the discharge of capacitor 110 through LED 12. A positive current, in the form of a pulse width, is applied to transistor 125 from control circuitry 130. This waveform controls the time for which capacitor 110 discharges, thus controlling the time for which peak current flows through LED 12. The peak current through LED 12 is set by the amount of voltage which is present across capacitor 110. This simple arrangement allows for effective control of the LED 12 in pulsed operation.

The invention has been described in detail with particular reference to certain preferred embodiments thereof, but it will be understood that variations and modifications can be effected within the spirit and scope of the invention.

What is claimed is:

1. Method for reading an indicia of fluorescent material, said method comprising the steps of:

pulsing a light emitting diode at a forward current level above continuous use operating limits to produce pulsed radiation, said radiation being within an absorption spectrum of said fluorescent material and at a flux density sufficient to induce a fluorescent emission from said indicia;

illuminating said indicia with said pulsed radiation to produce said fluorescent emission; and imaging said indicia on a radiation image sensor sensitive to radiation within an emission spectrum of said fluorescence.

2. The method of claim 1 wherein said pulsing further comprises pulsing a plurality of light emitting diodes at a forward current level above continuous use operating limits for each of said light emitting diodes to produce said pulsed radiation.

3. The method of claim 1 wherein said fluorescent emission is invisible.

4. The method of claim 1 wherein said fluorescent emission is infrared radiation.

5. The method of claim 1 wherein said pulsed radiation has a duty cycle of about 1 percent.

6. A data reader for reading indicia of fluorescent material, said data reader comprising:

a body;

an image sensor held by said body, said image sensor being sensitive to said indicia radiation images;

a light emitting diode held by said body;

a power unit disposed in said body, said power up it driving said light emitting diodes with a pulsed forward current at a level above continuous use operating limits for said light emitting diode.

7. The data reader of claim 6 further comprising t plurality of light emitting diodes and wherein said power unit drives each of said light emitting diodes with a pulsed forward current at a level above continuous use operating limits for said light emitting diodes.

8. The data reader of claim 6 further comprising an optical system imaging on said image sensor.

9. The data reader of claim 6 wherein said image sensor is sensitive to a band of invisible radiation.

10. The data reader of claim 6 wherein said image sensor is sensitive to a band of infrared radiation.

11. The data reader of claim 6 wherein said body has a handle.

12. A system comprising a combination of the data reader of claim 6 and media bearing indicia of fluorescent material, wherein said image sensor is sensitive to radiation within a fluorescence emission spectrum of said fluorescent material.

* * * * *

UNITED STATES PATENT AND TRADEMARK OFFICE
CERTIFICATE OF CORRECTION

PATENT NO. : 6,184,534 B1
DATED : February 6, 2001
INVENTOR(S) : Thomas M. Stephany, et al.

It is certified that error appears in the above-identified patent and that said Letters Patent is hereby corrected as shown below:

<u>Column 6, claim 6,</u>
Line 11, delete "power up it" and insert -- power unit --

Signed and Sealed this

Sixteenth Day of October, 2001

Attest:

NICHOLAS P. GODICI
Attesting Officer    *Acting Director of the United States Patent and Trademark Office*